United States Patent
Blomqvist et al.

(10) Patent No.: US 9,127,943 B2
(45) Date of Patent: Sep. 8, 2015

(54) SPRING STRUCTURE, RESONATOR, RESONATOR ARRAY AND SENSOR

(75) Inventors: Anssi Blomqvist, Helsinki (FI); Jaakko Ruohio, Helsinki (FI)

(73) Assignee: MURATA ELECTRONICS OY, Vantaa (FI)

( * ) Notice: Subject to any disclaimer, the term of this patent is extended or adjusted under 35 U.S.C. 154(b) by 397 days.

(21) Appl. No.: 13/407,860

(22) Filed: Feb. 29, 2012

(65) Prior Publication Data
US 2012/0222483 A1 Sep. 6, 2012

(30) Foreign Application Priority Data

Mar. 4, 2011 (FI) .................................. 20115223

(51) Int. Cl.
| | |
|---|---|
| G01C 19/00 | (2013.01) |
| G01P 3/44 | (2006.01) |
| G01P 15/08 | (2006.01) |
| G01C 19/574 | (2012.01) |
| G01C 19/5719 | (2012.01) |

(52) U.S. Cl.
CPC .......... *G01C 19/574* (2013.01); *G01C 19/5719* (2013.01)

(58) Field of Classification Search
CPC ................................ F16F 7/104; G01P 15/08
USPC ................. 73/488, 504.02, 504.12, 504.134; 188/379; 267/37.3, 136
See application file for complete search history.

(56) References Cited

U.S. PATENT DOCUMENTS

| | | | |
|---|---|---|---|
| 5,908,986 A | 6/1999 | Mitamura | |
| 6,752,017 B2 | 6/2004 | Willig et al. | |
| 8,413,509 B2 * | 4/2013 | Geisberger | 73/514.32 |
| 8,453,504 B1 * | 6/2013 | Mao | 73/504.14 |
| 8,459,111 B1 * | 6/2013 | Mao | 73/504.14 |
| 8,616,057 B1 * | 12/2013 | Mao | 73/504.14 |

(Continued)

FOREIGN PATENT DOCUMENTS

| | | | |
|---|---|---|---|
| DE | 102009026511 A1 * | 12/2010 | |
| EP | 2 202 484 A1 | 6/2010 | |

(Continued)

OTHER PUBLICATIONS

International Search Report for Corresponding PCT Application No. PCT/FI2012/050194, dated Aug. 31, 2012.

(Continued)

*Primary Examiner* — Hezron E Williams
*Assistant Examiner* — Tarun Sinha
(74) *Attorney, Agent, or Firm* — Squire Patton Boggs (US) LLP

(57) ABSTRACT

The invention presents a spring structure (501), which has at least two masses (Ma, Mb) coupled in a first direction as opposite phase oscillators by means of springs (Sh1, Sh2) connected to them (Ma, Mb), via a loop (L, E) between said springs (Sh1, Sh2) connected to their coupling points, wherein oblique springs (Sl45, Sr45) are connected from said coupling points of the loop (L) to the anchors (A) of the base such that the longitudinal motion of the loop (L) is arranged to occur perpendicularly or substantially perpendicularly to said first direction, to thus attenuate opposite phase oscillation other than that of the masses (Ma, Mb). The invention also presents the use of a spring structure in a resonator and/or in a resonator array as well as in a sensor or a sensor comprising system.

10 Claims, 5 Drawing Sheets

(56) References Cited

U.S. PATENT DOCUMENTS

| | | |
|---|---|---|
| 2005/0066728 A1 | 3/2005 | Chojnacki et al. |
| 2005/0072231 A1 | 4/2005 | Chojnacki et al. |
| 2006/0010978 A1* | 1/2006 | Lee et al. .................. 73/504.02 |
| 2006/0230830 A1 | 10/2006 | Geen et al. |
| 2010/0139399 A1* | 6/2010 | Geiger et al. .............. 73/504.12 |
| 2010/0154543 A1* | 6/2010 | Diem ........................ 73/504.14 |
| 2010/0186505 A1 | 7/2010 | Sattler et al. |
| 2010/0300203 A1 | 12/2010 | Gotoh |
| 2012/0055248 A1* | 3/2012 | Hammer ................... 73/504.12 |

FOREIGN PATENT DOCUMENTS

| | | |
|---|---|---|
| EP | 2 584 312 A1 | 4/2013 |
| WO | WO 2010/034556 A2 | 4/2010 |

OTHER PUBLICATIONS

Finnish Search Report corresponding to Finnish application No. 20115223 dated Nov. 4, 2011.
Supplementary European Search Report application No. EP12 75 5335 dated Jul. 29, 2014.

* cited by examiner (Known as such)

(Known as such)

(Known as such)

(Known as such)

SPRING STRUCTURE, RESONATOR, RESONATOR ARRAY AND SENSOR

The invention relates generally to resonator technology, but more specifically the invention relates to sensors, and, in these, specifically to the elimination of error by means of such a spring structure as is presented in the preamble of the independent claim relating to it. The invention also relates to a resonator as is said in the preamble of the independent claim relating to a resonator. The invention also relates to a resonator array as is said in the preamble of the independent claim relating to a resonator array. The invention also relates to a sensor as is said in the preamble of the independent claim relating to a sensor. The invention also relates to a sensor system, which has at least one resonator according to the invention.

Vibration and impact resistance are key characteristics required of angular velocity sensors. In particular, in automotive industry applications of known art, such as driving stability control systems, these requirements are extremely strict. Even a hard external strike, for example, from a rock, or vibration caused by an automobile player should not affect the output of the angular velocity sensor.

In micromechanical resonators according to known art, such as for example, in angular velocity sensors, it is thought to be preferable to design a coupling spring between moving masses, which spring would allow their opposite-phase motion and, at the same time, resist the common mode motion of the masses. Such an arrangement is indeed used particularly to separate mechanical strikes from an actual signal. In this case, a signal to be detected from the masses is differential, whereas acceleration affecting them jointly causes a common mode deflection.

Figure 1:
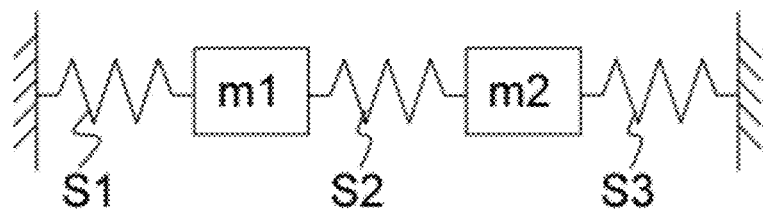

A simple coupling resonator is composed of two masses (m1, m2) and three similar one-dimensional springs (S1, S2, S3) according to FIG. 1. Such a structure efficiently separates the common mode motion of the masses (m1, m2) from the differential of the mode. However, in regard to sensitivity to acceleration, the structure is not preferred, since the masses deflect more easily (the frequency of the mode is lower) in-phase than opposite phase, because the coupling spring does not participate in the motion of the in-phase. In the diagrammatic view of a simple coupled resonator in FIG. 1, its spring coupling masses is a similar one-dimensional spring as the others.

Particularly, Bosch has in U.S. Pat. No. 6,752,017 B2 described a coupled spring structures for such a gyro of a Z-axis, in which the motion of detection is the opposite phase oscillation of the masses on a common axis of motion. Common to these spring structures of known art is that they participate in defining frequencies of both primary and secondary modes and the factor that they are placed between adjacent masses to be coupled.

However, the weakness of spring structures described by known art is sensitivity to linear acceleration, since they are, like a simple coupled resonator described above, more loose to common mode motion than to opposite phase, wherein strikes and vibration deflect the masses (m1, m2) more easily than the desired opposite-phase excitation. Additionally, non-linearity of the primary mode is difficult to control because the spring structures participate in both modes. Therefore, it would be preferable to entirely separate the spring structures coupling the different modes, wherein the non-linearity of the suspension of the primary motion could be dimensioned independently from the secondary suspension.

As an improvement has indeed been presented for use a seesaw-like coupling spring equipped with oscillating masses on one-dimensional axes, which spring is in regard to mechanical interferences a clearly better solution, because it is stiffer to in-phase than to opposite-phase deflection. Such a coupling suspension is, for example, implemented for the y-directional primary motion of the exciter frames in FIG. 2, which illustrates a Z-axis angular velocity sensor according to known art, which has, for example, a seesaw-like coupled spring structure in the direction of the y-axis in the upper and lower ends.

Figure 2:
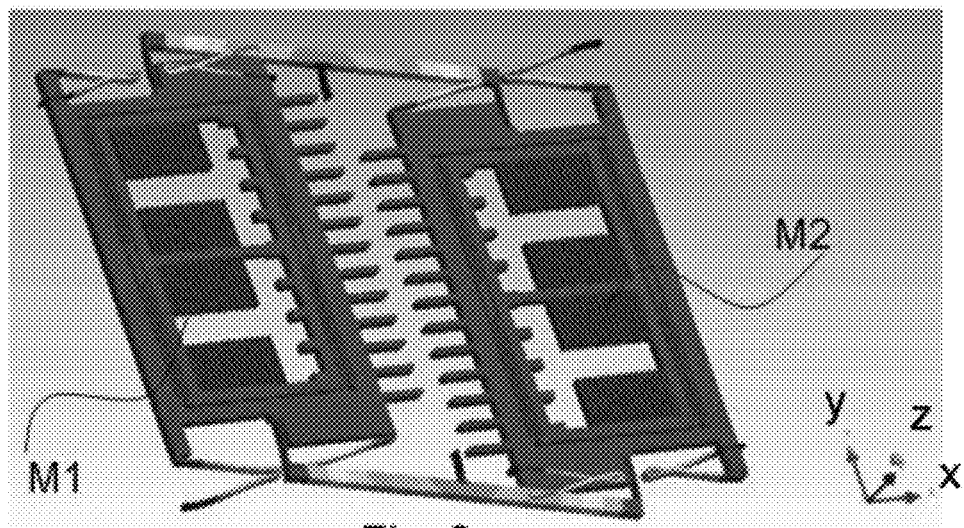

However, missing entirely from the angular velocity sensor structure of FIG. 2 is coupling between the masses M1 and M2 within the frame, wherein, in the direction of the x-axis, the masses function as nearly independent acceleration sensors. Without coupling they are mechanically nearly as sensitive to (common mode) mechanical interferences as to the opposite phase Coriolis force to be detected. The question of how it would be preferable to design for the masses a coupled suspension remains thus open, which suspension would prevent their in-phase motion, but would not, however, participate in the primary motion in the direction of the y-axis.

A seesaw suspension as described above forms a workable solution as such with masses moving on unidirectional and parallel axes, but thinking about a tightly packed structure it takes up a great amount of space. Such a in a sense wasteful opposing structure, equipped with masses moving on a common axis, is roughly illustrated in FIG. 3. From FIG. 3 it is clearly apparent that such a structure takes up nearly the entire space between the masses, which earlier was used for the excitation comb structures of the primary motion.

Solutions according to known art have indeed aimed at solving the problem of how to design for the masses a coupling suspension, which would prevent their in-phase motion, but would not participate in the primary motion in the direction of the y-axis.

Bosch patent document WO 2010/034556 A3 also discloses a suspension composed of four corner elements, which could be adapted also to the secondary mode coupling of an angular velocity sensor. Because the attachment points to the base are constructed in its outer corners, this results in deformations caused by, for example, a change in temperature, which cause strains and change the resonance frequencies of the structure. The tension removing structures added between the corner elements decrease the strains, but take up a great amount of space.

Therefore, in the solutions of known art presented above, there remains unsolved the problem of how to implement, at the same time, a compact structure, which, however, would be capable of functioning more readily in opposite phase oscillation mode than in in-phase, and of how as a result of the opposite phase mode it would become possible to utilize the advantages offered by the opposite phase, for example, to remove interferences.

Figure 4:
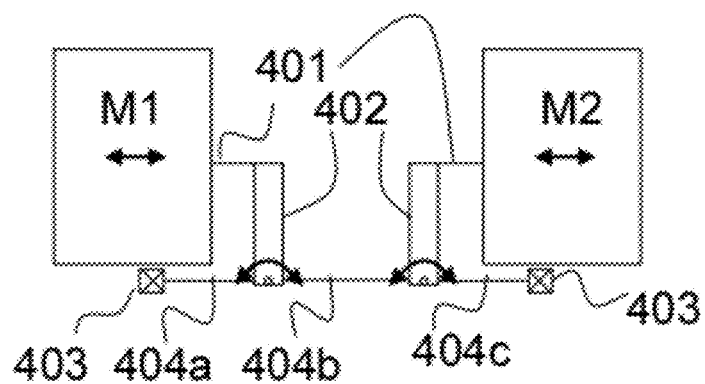

Inventors have indeed noticed that a spring structure coupling two masses can be implemented by a spring structure, which is composed of two stiff beams as well as of a deflection spring coupling the beams together. The beams are suspended such that they can pivot around a support point located at the end. From the other end, the beams are connected to the masses to be coupled. FIG. 4 shows a simple spring structure according to known art.

FIG. 4 illustrates as a simple example such a spring structure according to known art arranged to couple the masses M1 and M2 oscillating on a common axis to the opposite phase oscillation. In this case, the spring structure has a spring structure 401, 402, 403, 404a, 404b, 404c coupling two masses, which spring structure is composed of two stiff beams 402 as well as a deflection spring 404a, 404b, 404c coupling the beams 402 together. The beams are suspended 403 such that they can pivot around a support point located at the end. From the other end, the beams are connected 401 to the masses M1, M2 to be coupled.

Above said suspension solution is obviously more compact and in regard to utilization of space better than the solution presented by Bosch, but in performance is obviously left behind. Using practical dimensioning, the suspension is approximately 4 times stiffer to a deviation of the same mode, whereas, using the solutions attached from the corners, even more than six times greater a stiffness can be reached.

Figure 3:
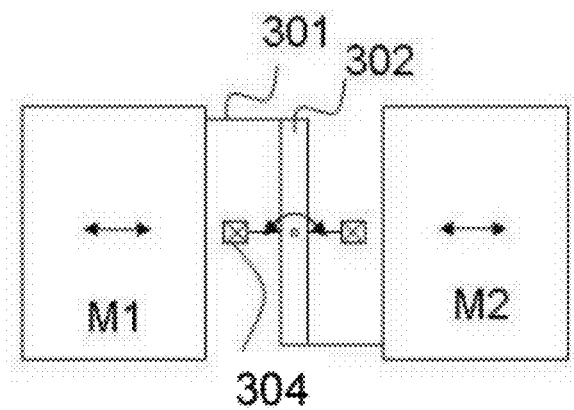

Although using spring solutions according to FIGS. 2-4 many of the problems of known art have been successfully solved, it is, however, due to the widely varied natures of interferences, quite difficult to find a generally effectual solution to all problems. In above earlier described situations, one problem of known art relates to interferences, in which a mechanical interference couples to the resonator via linear acceleration. In this case, by a spring structure according to the invention, the problems of known art can be solved or at least their influence can be mitigated. The purpose of the invention is indeed to present a new spring solution oscillating in a pure mode to be used also in a differential linear resonator to eliminate mechanical interferences caused by linear acceleration.

A spring structure according to the invention is characterized by what is presented in the characterizing part of the independent claim relating to it.

A resonator according to the invention is characterized by what is presented in the characterizing part of the independent claim relating to it.

A resonator array according to the invention is characterized by what is presented in the characterizing part of the independent claim relating to it.

A sensor according to the invention is characterized by what is presented in the characterizing part of the independent claim relating to it.

A sensor system according to the invention is characterized by what is presented in the characterizing part of the independent claim relating to it.

A spring structure according to the invention has two masses coupled in a first direction as opposite phase oscillators by means of springs connected to them, via a loop connected between said springs connected to their coupling points, wherein oblique springs are connected from said coupling points of the loop to the anchors of the base such that motion of the loop is perpendicular or substantially perpendicular towards said first direction, to attenuate opposite phase oscillation other than that of the masses (Ma, Mb).

In the spring structure according an embodiment of the invention, the oblique springs are symmetrically in relation to the loop.

In the spring structure according an embodiment of the invention, the oblique springs have the same spring constant. According to an embodiment variant, the coupled structure can have, however, different spring constants between different units in its units in the double-differential structures.

In the spring structure according to an embodiment of the invention, the oblique springs have the same composition.

In the spring structure according to an embodiment of the invention, the oblique springs have in common at least one from the dimensions length, width, thickness.

In a double differential spring structure according to an embodiment of the invention, there are two spring structures according to an embodiment of the invention coupled using a connecting stiff member as opposite phase oscillators, which both have two masses coupled into opposite phase oscillations.

In a resonator according to the invention, there is at least one spring structure according to an embodiment of the invention.

In a resonator array according to the invention, there is at least an resonator according to one embodiment of the invention.

A sensor according to the invention can be implemented using a resonator according to an embodiment of the invention.

In a sensor system according to the invention, there is at least an sensor according to an embodiment of the invention.

Other embodiments of the invention are presented in the dependent claims. The embodiments of the invention can be combined as appropriate. Examples according to embodiments of the invention are described in the description as well as in the figures relating to it. In the figures, there are used the same reference markings from similar types of parts, which, however, are not necessarily identical to each other. In this case, the skilled person will know the potential differences on the basis of that what is presented. The parts and their dimensions or order can vary, nor are they necessarily on scale with each other.

LIST OF FIGURES

FIGS. 1-4 refer to art known per se or to art presented elsewhere and known to the applicant by the filing date of the application as follows:

FIG. 1 A schematic diagram of a simple coupled resonator according to known art, FIG. 2 Illustrates a solution according to known art as a Z-axis angular velocity sensor, FIG. 3 Illustrates the space requirement of a resonator solution according to known art, which has a seesaw-like coupling suspension between the masses, FIG. 4 Illustrates a structure according to known art, in which the spring structure couples masses oscillating on a common axis, Because FIGS. 1-4 refer to art known per se, as is said above, in the following are presented examples by making reference to FIGS. 5-12 in order to illustrate embodiments of the invention presented in the present application. In this case, there is no desire to limit the embodiments only to embodiments according to the presented examples, nor only according to the relative dimensions revealed in the figures. The embodiments of the invention can be combined with one another as appropriate.

Figure 5:
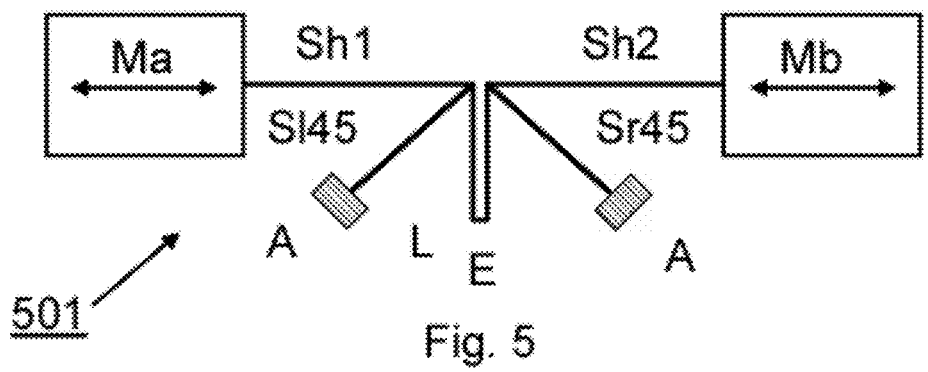
Figure 6:
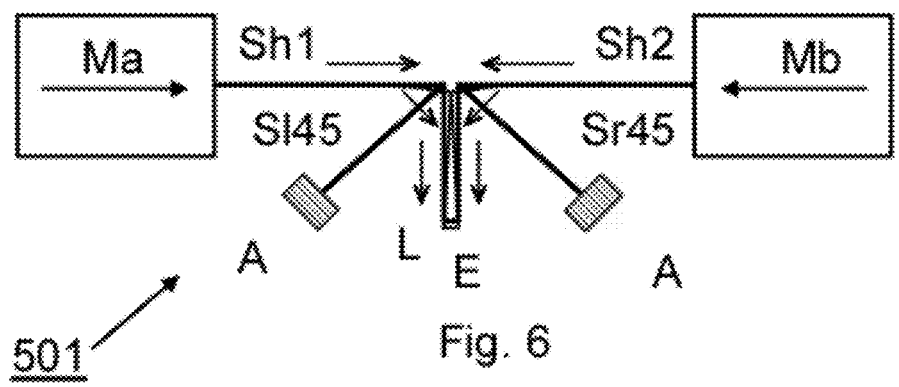
Figure 7:
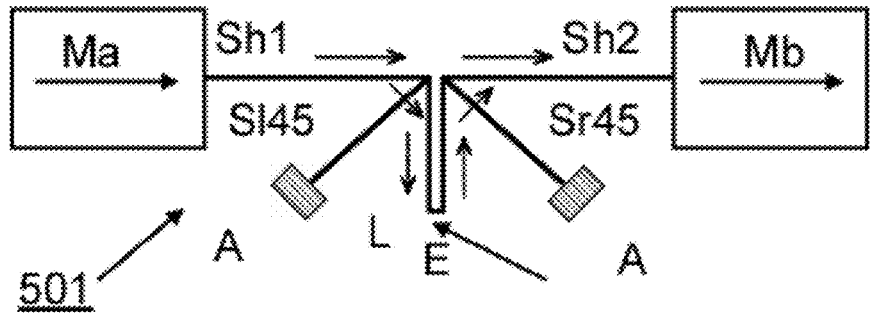
Figure 9:
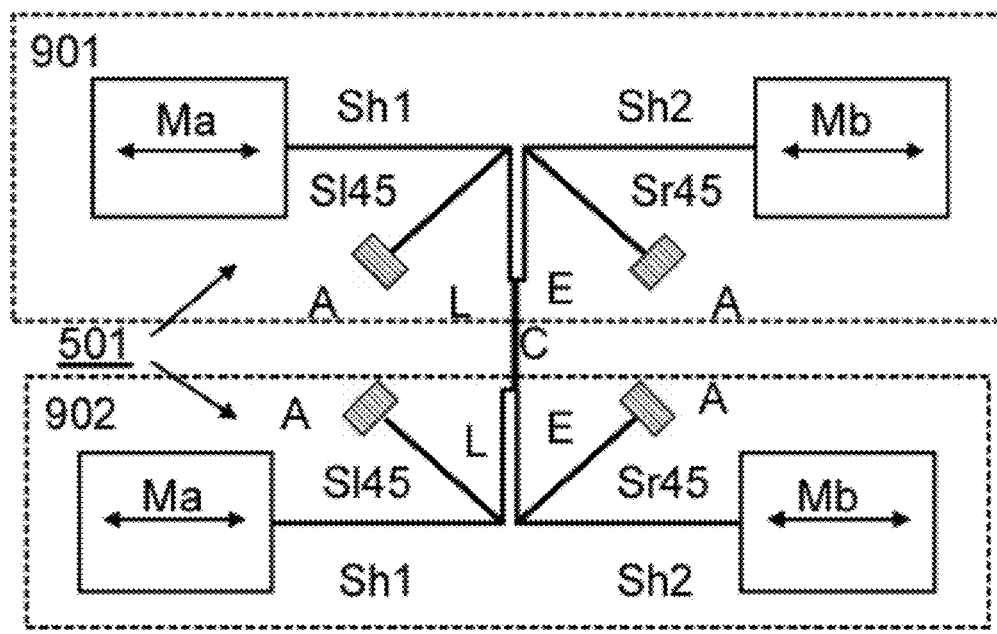
Figure 10:
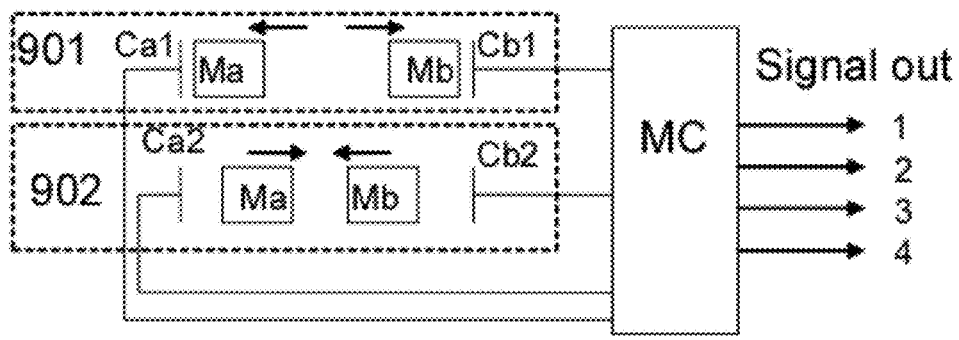
Figure 8:
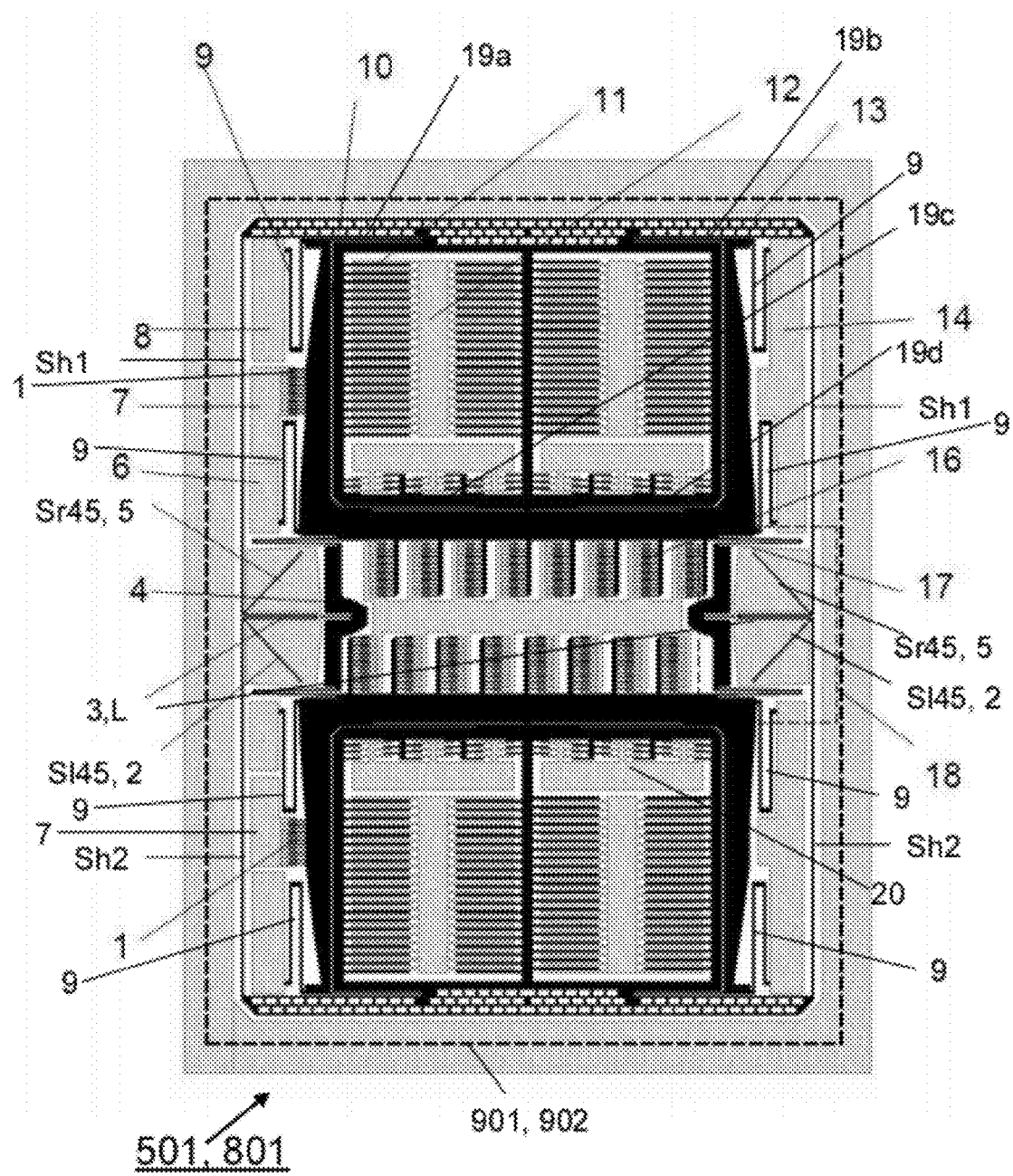
Figure 11:
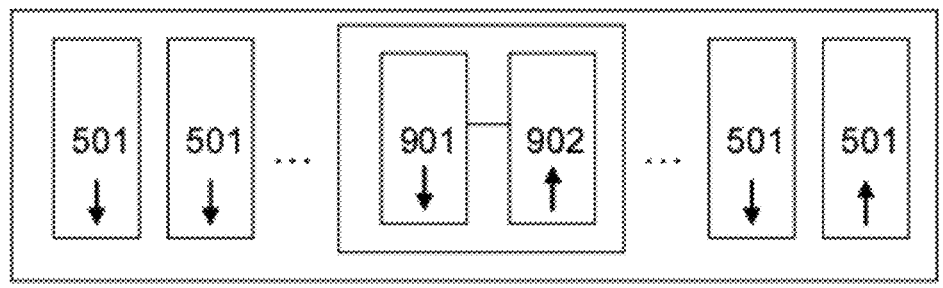
Figure 12:
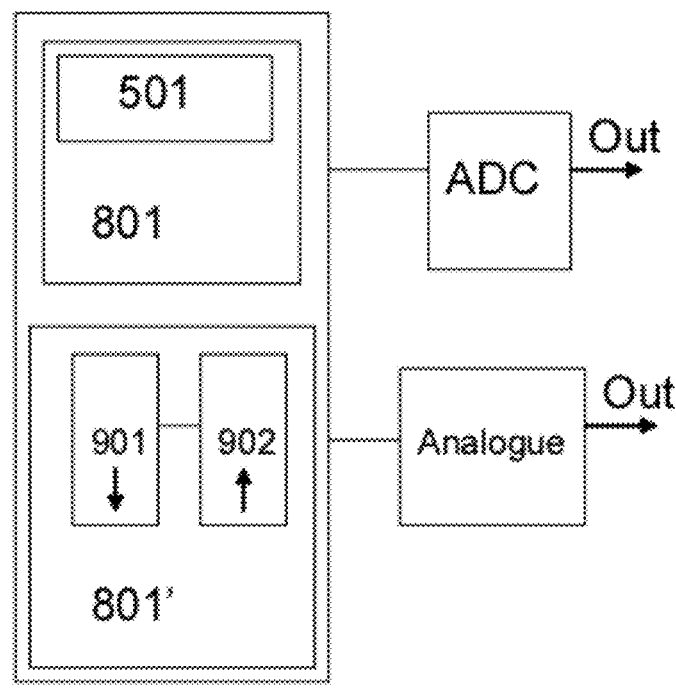

FIG. 5 illustrates a spring structure according to an embodiment of the invention, FIG. 6 illustrates the function of an embodiment of the invention, in the opposite phase mode, FIG. 7 illustrates the function of an embodiment of the invention in eliminating the co-phase mode, FIG. 8 illustrates a suspension according to an embodiment of the invention in a secondary resonator of an angular velocity sensor, FIG. 9 illustrates a double-differentially coupled spring structure according to an alternative embodiment of the invention, FIG. 10 illustrates the formation of a capacitive signal according to an embodiment of the invention, FIG. 11 illustrates resonator arrays according to an embodiment of the invention, and FIG. 12 illustrates a sensor system according to an embodiment of the invention.

DESCRIPTION FROM A PLURALITY OF EMBODIMENT EXAMPLES OF THE INVENTION

The embodiments of the invention relate to oscillating micromechanical resonators, such as, for example, angular velocity sensors. In this document, there is, however, not intended to limit the presented spring structure only to resonator structures, nor only to elimination of mechanical interferences caused by linear acceleration in a differential linear resonator, rather the solutions can also be applied to eliminating also the interferences of other resonators according to the characterizing features of the claims.

In the following description, the directions used as illustration, left, right, up and/or down are mere examples in reference to the presented media, nor do they mean any sort of limitations in relation to the orientation of the parts, for example, in relation to the direction of the gravitational field on the surface of the Earth.

FIG. 5 presents an illustration of a coupling suspension according to an embodiment of the invention. The suspension has two springs Sl45, Sr45 anchored from the other end, which yield at an oblique angle in relation to the axis of motion of the resonators. Although, for illustrative purposes, designations have been used for these, in which 45 refers to an oblique angle according to the number, there is no desire for the angle used in embodiments of the invention to be exclusively a 45° angle. Nor is there any desire to limit the embodiments of the invention only to such types, in which the angle of the left spring Sl45 of the spring structure would be symmetrical in relation to the angle of the spring Sr45 on the right side. Nor is there any desire to limit either of said angles between the springs as measured in relation to the longitudinal direction of the horizontal left side spring Sh1, nor in relation to the longitudinal direction of the horizontal right side spring Sh2. According to an asymmetrical embodiment of the invention, the influence of a different angle can be compensated by influencing on the spring constants of the springs through their dimensions and/or material selections in a manner according to art known per se in those embodiments, in which taking into consideration the space requirements of an oblique angle gives cause for an asymmetrical angle solution in the angle between the springs Sh1 and Sl45 or the angle between the springs Sh2 and Sr45. Oblique springs Sl45 and Sr45 are coupled from their other end to the base in its anchoring points A.

According to an embodiment of the invention, at least one of the springs Sh1, Sh2, L, E, Sl45, Sr45 is arranged to be stiff in relation to the longitudinal direction. According to the embodiment of the invention, at least one of said springs is arranged to be yielding in the perpendicular direction in relation to its longitudinal axis, wherein the motions of the springs illustrated by means of FIGS. 5 and 6 using arrows are achieved.

According to an embodiment of the invention, at least one spring is flat-modelled, in other words substantially a rectangular prism, in which the length is at least 1.5 times, preferably at least 5 and more preferably at least 8 times the smallest dimension in perpendicular direction to the longitudinal length direction. Said perpendicular direction has a width and thickness, which are dimensions in perpendicular directions in relation to each other. By dimensioning thickness and width smaller as the said other, the spring can be made to yield more readily in the direction of the thinner dimension than in other directions. By a flat-modelled spring can be achieved yield in a given direction. According to some corresponding embodiments, a stiffly behaving piece can be triangular, a regular polygon or circular of cross-sectional form.

In the manner indicated in the example of FIG. 6, the other end of springs Sh1 and Sh2 is coupled to masses Ma and Mb in the direction of the axis of motion by stiff structures, which preferably yield in other directions. As masses Ma and Mb move in the opposite-phase, the suspension is at its softest for the motion of such a phase, since the loop can move downwards and the branches of the structure yield. Springs Sh1 and Sh2 are coupled to each other with a spring structure Sl45, L, E, Sr45, which structure allows the ends to move in the direction of motion of the springs in the opposite-phase (FIG. 6), but not substantially in the in-phase (FIG. 7). In this case, the suspension coupling the springs is extremely stiff to a in-phase deviation, since both branches of the loop L, both left as well as right, tend to deviate in opposite directions and the end E is stiff when short.

FIG. 8 presents, as a part of an angular velocity sensor structure 501, 801, a suspension according to an embodiment of the invention. In this implementation of a structure, the suspension is coupled to the masses by long beam springs, which yield in the direction of the primary motion (x), but transmit secondary motion (y) to the coupling suspension. FIG. 8 presents, for illustrative purposes, the following parts 1-20, wherein the person skilled in the art will better understand the function of spring structures according to the embodiments. The terms up, down, to the side, to the left, to the right are used according to a western reading direction of the presentation media when illustrating directions per se for making reference, but, however, without limiting the directions of use of structures according the embodiments only according to them.

FIG. 8 presents the primary motion capacitive detection comb of the lower mass, which is shown in FIG. 8. In FIG. 8 is also a primary anchor 7, which, in turn, is attached to the substrate and/or the lid of the structure, to attach the component of the primary resonator to the frame. In a corresponding manner to the upper mass, by means of the same sketched mark, is shown a corresponding part. In a differentially implemented embodiment, the detection combs 1 of the upper part (for example, 901) and the lower part (for example, 902) of FIG. 9 can function together in an opposite phase mode, wherein separating the signal from noise and other similar interference is easier.

According to an embodiment of the invention, the upper part and lower part of the angular velocity sensor are reflectively symmetrical in relation to a straight line defined by the left and right side loops. According to an embodiment of the invention, in this case, at least one part has two detection combs. According to an embodiment of the invention, at least either one of the sides, the left or the right, has two detection combs. The number of detection combs, symmetry and/or location per se is not desired to be limited only according to the presented embodiment examples.

The oblique guide spring 2 is a deflection spring, which converts the direction of the secondary (y) motion of the lower mass into perpendicular (x). The loop L, 3 coupling the suspension is arranged to move in a perpendicular direction in relation to the masses, wherein, according to an embodiment, the arms yield, as the oblique guide springs move in the opposite-phase. According to an embodiment, the end does not yield, as the oblique guide springs move in the in-phase. According to an embodiment, the spring 4 coupling the primary motion is arranged to impede in-phase motion of the masses in the direction of the primary (x) axis. According to an embodiment, the oblique guide spring 5 is a deflection spring, which converts the direction of the secondary (y) motion of the upper mass into perpendicular (x). The primary anchors 6, 8, 14 are used to illustrate the area according to the invention, which is attached to the substrate (to the base) and/or lid. In this case, the primary anchor attaches the component of the primary resonator to the frame. According to an embodiment of the invention, the parts L of FIG. 9 are coupled together with a stiff member C, wherein the upper-side and lower-side structures of FIG. 9 can be coupled into opposite phase by connecting parts 3, L to each other from above and from below, such as the parts 901 and 902 of the differential structure indicated by FIG. 9.

The primary spring 9 shown in FIG. 8 is intended to suspend the primary motion in as linear a manner as possible in the direction of the primary axis (x). The part 9 is then dimensioned to be as stiff as possible in other directions. The primary slide 10 is per se a stiff structure shaped like the letter C, which, according to an embodiment of the invention, can move only in the direction of the primary axis (x). According to an embodiment of the invention, the rotor finger 11 of the secondary comb, is a part of the mass. Said part 11 is a moving electrode of the secondary capacitance to be detected. According to an embodiment of the invention, the stator anchor 12 of the secondary comb is a static electrode of the secondary capacitance to be detected.

In FIG. 8, reference is made to the end 13 of the mass as a piece, which is as stiff as possible and which transmits the motion of the mass to a coupling suspension. Although in FIG. 13 is indeed shown one mass end at the top of the figure, this is not intended to limit the embodiments of the invention to only according to what is shown.

In FIG. 8, by utilizing the drive comb 16 (stator and rotor) of the primary motion, opposite electrostatic force can be created to both masses using a common voltage to excite and/or maintain the primary motion.

In FIG. 8 is also illustrated the anchor area 17 for the suspensions coupling the primary motion and the secondary motion. According to an embodiment of the invention, the suspension coupling the primary motion can be implemented by means of a suspension 18 coupling the secondary resonator. FIG. 8 illustrates secondary springs 19a, -b, -c, -d between the primary slide of the deflection spring in the x-direction and the masses. According to an embodiment of the invention, the function of the secondary springs is to allow the masses to deflect from the primary motion only in the direction of the secondary axis (y). The secondary springs are as stiff as possible in other directions. Reference 20 in FIG. 8 refers to a quadrature compensation comb and its anchor.

The area 901, 902 defined by a dashed line illustrates solutions according to an embodiment of the invention in a spring structure according to FIG. 9. In connection with the parts 901 and 902, the dashed line illustrates a given alternative nature of the embodiment, to which relates the alternative nature of the orientation of the loops 3, L of either the left side, right side or both sides in relation to the opposite direction that is now presented. In this case, a stiff member C can be coupled between two such structures 801, by which can be achieved the spring structures illustrated by the parts 901 and 902 in FIG. 9 and the coupling between them to set the phase difference. In this case, on the basis of what is presented, it is obvious that to form pairs for the double differential structure, some may be reflectively symmetrical, depending on the orientation of the loops 3, L of the parts of the pair.

Although the parts Sh1 and Sh2 do appear to be drawn as a line, these are, however, in connection with each other via the loop 3, L.

The embodiment shown in FIG. 8 has an asymmetry between the edges of the left and right sides as is shown in the figure. This is due to the masses being, according to the embodiment example, arranged to be mobile in the direction of the x-axis in the opposite-phase and from these that primary motion is detected as differential, wherein for the placement of the combs 1, 7 it is preferable that they be on the same side.

The opposite-phase motion per se can, in turn, be excited electrostatically according to an embodiment using a single-end voltage to the comb system 16, in order that possible crosstalk caused by stray capacitances are cancelled as symmetrical out in the differential detection as are also external interferences.

According to an alternative embodiment of the invention, the spring structure can also function, for example, in the primary resonator of a tuning fork-type sensor, in this case allowing only or substantially only the opposite-phase primary motion of the masses, but preventing overloading of the sensor even at great accelerations.

Correspondingly, the invention is suitable in connection with nearly any kind of opposite-phase linear resonators in order to improve its resistance to interference.

FIG. 9 illustrates an alternative solution according to an embodiment of the invention, in which are used two (901, 902) spring structures according to an embodiment of the invention, which spring structures are coupled with a stiff compound structure C into opposite phase. In this case, loops 3, L are oriented towards one another to enable connection with a stiff member C. According to an embodiment of the invention, a stiff member C can be uniformly thick, but its thickness and width can vary along its longitudinal direction to achieve a function of progressive flexibility. According to an embodiment, it has weakened flex points in the direction of thickness and/or width, which are achieved by changing the strength of the material locally. To couple oscillations, C is preferably stiff also in the perpendicular direction in relation to the direction of oscillators coupling to each other with C. When in this case loop L is stiff at least in the longitudinal direction (perpendicular towards the longitudinal direction of the part E according to an embodiment), then the mechanical motion between the parts 901 and 902 can be transmitted by means of a compound structure C. By arranging at least one of the following: loop L (in the part 901 and/or in the part 902) and/or stiff member C according to an embodiment to be progressive, a coupling depending on amplitude between parts 901 and 902 can also be created. According to an embodiment, in this case, progressive stiffness can be achieved in the direction perpendicular to the longitudinal axis. By coupling a standard phase difference between the parts 901 and 902, it can also be utilized the information between the phases of the oscillations of the masses of the parts 901 and 902 illustrated by the dashed line border, which information relates to the oppositeness of the phases in said parts, wherein the interferences coupling into the system formed by the parts can better yet be eliminated.

Additionally, if desired, given modes can be attenuated electrically by means of a capacitive coupling and the influence of the tractive force between the plates of the condenser, when to given plates of the condensers is introduced voltage in the right phase for attenuation, wherein the tractive force between the plates of the condenser can be utilized in attenuating motion. According to another embodiment of the invention, the condensers can also be utilized in exciting as an aid for the maintenance of a given oscillation mode, when introduction of voltage is phased in a different manner than in attenuation.

FIG. 10 illustrates the use of an embodiment according to the embodiment of FIG. 9 for forming capacitive signals by means of variable capacitances Ca1, Cb1, Ca2 and Cb2. In this case, the variation of the capacitances can be based on a change in the distance between the plates, and/or a change in the plate surface area common between the condenser plates forming the capacitance. In FIG. 10, the oscillations of the parts 901 and 902 are arranged to be in the opposite phase, wherein, when the capacitances Cal and Cb1 in the part 901 increase, the corresponding capacitances Ca2 and Cb1 of the part 902 decrease. The corresponding plates of the condenser of the masses Ma, Mb can each be coupled to some reference potential, for example, to the ground (not shown in the figure), wherein the corresponding plates in the masses receive a potential according to it. The potentials can also be the same or different potentials depending on, whether it is desired that the signal based on changes in corresponding capacitances have a given bias different from 0, or not (bias 0 V). For illustrative purposes, in the circuit MC forming the signal on the basis of changes in capacitance, there are presented as an example 4 outputs 1,2,3,4 by locally making reference to the outputs presented in the figure and illustrated with arrows, without limiting their number per se and/or other signal inputs or outputs per se. Although a double differential structure is presented in the figure, according to an embodiment of the invention, the simple signal of the embodiment (501) of a double differential structure can be read in the same manner capacitively like, for example, the capacitive reading of the oscillations formed by the part 901.

According to a variant of an embodiment according to the invention, the excitation frame structures of the part 902 can be left off, thus saving space. In this case, in a corresponding embodiment, it is also possible that, in the dimensioning of the excitation frame structures of the part 901, consideration must be made for mechanical motion resistance losses also for the part 902 as compensation for these. In this case, according to the embodiment of the invention, the loop 3, L in the part 901 should also be oriented towards the corresponding loop of the part 902, in order that these could be coupled to each other with a stiff member C. In this case, according to an embodiment, the orientation of the loops is preferably opposite to that shown in FIG. 8. According to an embodiment, parts 901 and 902 are reflectively symmetrical, according to an variant in relation to a straight line between the parts, according to another variant in relation to the point of the straight line, which would perpendicularly intersect the stiff member C. According to an embodiment variant, parts 901 and 902 are otherwise similar, but, for example, in part 901, the left-side loop is oriented in the opposite direction from that of the right-side and vice versa in the part 902.

FIG. 11 illustrates a resonator array, which has a first group of resonators according to an embodiment of the invention, of which at least some can be synchronized by means of an excitement signal together into in-phase oscillation. According to an embodiment of the invention, some other resonators of the resonator group can be synchronized into opposite phase oscillation in relation to said first group of resonators. According to an embodiment of the invention, the resonator array can have other phases to be synchronized to some other group of resonators. Different embodiment variants of the resonator groups relating to the phasing between them are illustrated in FIG. 11 with small arrows.

FIG. 12 illustrates such embodiments of the invention, in which a spring structure is utilized according to one of its embodiments. Nestled boxes are used to illustrate examples of previously referred embodiments of the invention with some alternatives and variants. Sensor 801' is otherwise like 801, but its structure differs due to the implementation of the opposite phaseness of the parts 901 and 902, although, in it, 801' does have two resonators 501. In this case, each of parts 901 and 902 of the sensor 801' have at least one loop 3, L such that between them can be coupled a stiff element C to phase the parts 901 and 902. Although by means of parts 901 and 902 is indeed illustrated such a double differential structure, which has two opposite phase parts, there is no desire to limit embodiments of the invention to only such embodiments, which have only two parts 901, 902, whose only one loops 3, L (from either the left or the right edge) are oriented towards the other to use a stiff member C in phasing of said parts 901 and 902 in the sensor 801'.

In such embodiments of the invention, which have several sensor parts 801', as implemented using parts 901 and/or 902, among these can be such ones, in which both the left-side and right-side loops 3, L are oriented oppositely in relation to the example shown in FIG. 8, wherein sensor parts can be chained by means of stiff members C to phase the sensors. In this case, the capacitive excitement should also be configured according to the phasing of the chain to achieve and/or to maintain a common phase for the desired parts.

By attaching the box ADC to FIG. 12, such embodiments are illustrated, in which a spring structure according to the embodiment of the invention is along as a part of the system of such a larger entity, in which are utilized a resonator according to an embodiment of the invention or a group of such resonators. ADC refers thus also to such embodiments, in which the signal that can be obtained from the resonator is converted into digital form, without, however, limiting to only this. Although in the figure, using the box Analogue, is illustrated the possibility of an analog signal output in parallel with that of the digital signal, these is no desire to limit the invention only to parallelism, rather only either one of the outputs can also be implemented according to corresponding embodiments.

The advantages of the invention in comparison to known art are small use of space as well as an exceptionally slight stiffness to opposite-phase deflections. Adding a coupling according to the invention to the sensor structure thus does not significantly decrease its mechanical sensitivity.

The attachment points to the masses of a suspension according to the invention are located on the same straight line in the direction of the axes of motion. Due to this, the reactive forces of the spring do not cause moment to the masses, like, for example, a seesaw spring.

Additionally, the location of the anchor points close to each other improves the robustness of the solution, for example, to torsions caused by external or temperature changes, especially, for example, in comparison to solutions attached from the corners.

The invention claimed is:

1. A spring structure, comprising:
    at least two masses coupled in a first direction as opposite phase oscillators using springs connected to the masses, via a u-shaped member between said springs and connected to coupling points of the springs, wherein oblique springs are connected from said coupling points to anchors of base such that longitudinal motion of the u-shaped member is configured to occur perpendicularly to or substantially perpendicularly to said first direction, to thus attenuate in-phase oscillation and enable opposite phase oscillation of the masses, wherein the oblique springs are oblique with respect to both the springs and the u-shaped member.

2. A spring structure according to claim 1, wherein the oblique springs are symmetrical in relation to the u-shaped member.

3. A spring structure according to claim 1, wherein the oblique springs have the same spring constant.

4. A spring structure according to claim 1, wherein the oblique springs have the same chemical and/or structural composition.

5. A spring structure according to claim 1, wherein the oblique springs have in common at least one of the dimensions length, width or thickness.

6. A double differential spring structure, which has two spring structures according to claim 1 coupled with a connecting stiff member as opposite phase oscillators.

7. A resonator, comprising:
at least one spring structure,
wherein the spring structure comprises at least two masses coupled in a first direction as opposite phase oscillators using springs connected to the masses, via a u-shaped member between said springs and connected to coupling points of the springs.
wherein oblique springs are connected from said coupling points to anchors of a base such that longitudinal motion of the u-shaped member is configured to occur perpendicularly to or substantially perpendicularly to said first direction, to thus attenuate in-phase oscillation and enable opposite phase oscillation of the masses, and
wherein the oblique springs are oblique with respect to both the springs and the u-shaped member.

8. A resonator array, comprising:
at least one resonator, the resonator comprising at least one spring structure,
wherein the spring structure comprise at least two masses coupled in a first direction as opposite phase oscillators using springs connected to the masses, via a u-shaped member between said springs and connected to coupling points of the springs,
wherein oblique springs are connected from said coupling points to anchors of a base such that longitudinal motion of the u-shaped member is configured to occur perpendicularly to or substantially perpendicularly to said first direction, to thus attenuate in-phase oscillation and enable opposite phase oscillation of the masses, and
wherein the oblique spring are oblique with respect to both springs and the u-shaped member.

9. A sensor, comprising:
at least one resonator, the resonator comprising at least one spring structure,
wherein the spring structure comprises at least two masses coupled in a first direction as opposite phase oscillators using springs connected to the masses, via a u-shaped member between said springs and connected to coupling points of the springs,
wherein oblique springs are connected from said coupling points to anchors of a base such that longitudinal motion of the u-shaped member is configured to occur perpendicularly to or substantially perpendicularly to said first direction, to thus attenuate in-phase oscillation and enable opposite phase oscillation of the masses, and
wherein the oblique springs are oblique with respect to both the springs and the u-shaped member.

10. A sensor system, comprising:
a sensor comprising at least one resonator,
wherein the at least one resonator comprises at least one spring structure.
wherein the at least one spring structure comprises at least two masses coupled in a first direction as opposite phase oscillators using springs connected to the masses, via a u-shaped member between said springs and connected to coupling points of the springs,
wherein oblique springs are connected from said coupling points to anchors of a base such that longitudinal motion of the u-shaped member is configured to occur perpendicularly to or substantially perpendicularly to said first direction, to thus attenuate in-phase oscillation and enable opposite phase oscillation of the masses, and
wherein the oblique springs are oblique with respect to both the springs and the u-shaped member.

* * * * *